United States Patent Office 3,385,797
Patented May 28, 1968

3,385,797
CATALYST MANUFACTURE
Herman S. Bloch, Skokie, Ill., and William G. Nixon, Clearwater, Fla., assignors to Universal Oil Products Company, Des Plaines, Ill., a corporation of Delaware
No Drawing. Continuation-in-part of application Ser. No. 411,681, Nov. 13, 1964. This application Mar. 6, 1967, Ser. No. 620,622
4 Claims. (Cl. 252—439)

ABSTRACT OF THE DISCLOSURE

A refractory inorganic oxide is reacted with a hydrogen halide or ammonium halide and then reacted with a substantially anhydrous halosulfonic acid and a catalytic composition of matter is obtained for use as a hydrocarbon conversion catalyst.

---

This application is a continuation-in-part of our copending application Ser. No. 411,681, filed Nov. 13, 1964, now abandoned.

This invention relates to the manufacture of a novel hydrocarbon conversion catalyst and particularly to the manufacture of a novel hydrocarbon conversion catalyst comprising the reaction product of a hydrogen halide or ammonium halide and a substantially anhydrous halosulfonic acid with a refractory inorganic oxide so as to produce a novel catalytic composition of matter.

It is therefore an object of this invention to provide a method for preparing a novel hydrocarbon conversion catalyst. A further object of this invention is to provide a novel catalytic composition of matter.

One embodiment of this invention resides in a method of catalyst manufacture which comprises reacting a refractory inorganic oxide at a temperature of from about 100° C. to about 600° C. with a hydrogen halide or ammonium halide and subsequently reacting the resultant substantially anhydrous refractory inorganic oxide at a temperature of from about 100° C. to about 600° C. with a substantially anhydrous halosulfonic acid in an amount to chemically combine with the oxide from about 0.01 to about 3 weight percent of halogen and from about 1.0 to about 15.0 weight percent of sulfur.

A further embodiment of this invention resides in a catalytic composition of matter comprising the reaction product of a hydrogen halide or ammonium halide and a substantially anhydrous halosulfonic acid with a refractory inorganic oxide and containing in chemical combination with the oxide from about 0.01 to about 3 weight percent of halogen and from about 1.0 to about 15.0 weight percent of sulfur.

Other objects and embodiments will be found in the following further detailed description of our invention.

As hereinbefore set forth, the invention is concerned with a method for the preparation of a catalyst which possesses a high degree of hydrocarbon conversion activity in, for example, isomerization reaction in which the double bond of an olefinic hydrocarbon may be shifted to a more centralized position in the chain or the carbon skeleton arrangement of the compound may undergo rearrangement. Further, the catalyst of our invention is especially applicable to the isomerization of isomerizable saturated hydrocarbons including acyclic paraffins and cyclic naphthenes, and is particularly suitable for the isomerization of straight-chain and mildly branched-chain paraffins including 4 or more carbon atoms per molecule including normal butane, normal pentane, normal hexane, normal heptane, normal octane, etc., or cycloparaffins ordinarily containing at least 5 carbon atoms in the ring such as the alkylcyclopentanes and cyclohexanes including methylcyclopentane, dimethylcyclopentane, cyclohexane, methylcyclohexane, dimethylcyclohexanes, etc. It is also applicable to the conversion of mixtures of paraffins and/or napthenes such as those derived by selective fractionation and distillation of straight-run or natural gasolines and naphthas. Such mixtures of paraffins and/or naphthenes include so-called pentane fractions, normal hexane fractions, and mixtures thereof. As set forth above, the catalyst of our invention is also suitable for the isomerization of olefins, for example, the isomerization of butene-1 to cis and trans-butene-2 etc., the isomerization of 3-methyl-1-butene to 2-methyl-2-butene, etc. The catalyst may also be utilized for the isomerization of alkylaromatic hydrocarbons, for example, the isomerization of ethylbenzene to dimethylbenzene or xylene, the isomerization of propylbenzene to methyl ethyl benzene or trimethylbenzene, etc. Suitable modifications in isomerization operating conditions may be necessary when the catalyst is utilized for other than the isomerization of saturated hydrocarbons and therefore the various isomerization processes are not necessary equivalent.

As set forth hereinabove, the catalyst of our invention is especially applicable to the isomerization of saturated hydrocarbons such as normal butane, normal pentane, normal hexane, etc., and mixtures thereof. Furthermore, the saturated hydrocarbons are usually derived as selected fractions from various naturally occurring petroleum streams. For example, they may be separated as individual components or, as certain boiling range fractions by selective fractionation and distillation of straight-run natural gasolines and naphthas. Thus, the catalyst of this invention may be successfully applied to and utilized for complete conversion of isomerizable hydrocarbons when these isomerizable hydrocarbons are present in minor quantities in various gas streams. Thus, the isomerizable hydrocarbon for use in a process utilizing our catalyst need not be concentrated. For example, isomerizable hydrocarbons appear in minor quantities in various refinery gas streams, usually diluted with gases such as hydrogen, nitrogen, methane, ethane, propane, etc. These refinery streams containing minor quantities of isomerizable hydrocarbons are obtained in petroleum refineries from various refinery installations including thermal cracking units, catalytic cracking units, thermal reforming units, coking units, polymerization units, dehydrogenation units, etc. Such refinery off-streams have in the past often been burned for fuel value, since an economical process for the utilization of the hydrocarbon content has not been available. This is particularly true for refinery gas streams known as off-gas streams containing relatively minor quantities of isomerizable hydrocarbons.

As hereinbefore set forth, the invention is concerned with a method for the preparation of a hydrocarbon conversion catalyst possessing a high degree of hydrocarbon conversion activity. The catalyst comprises the reaction product of a hydrogen halide or ammonium halide and a substantially anhydrous halosulfonic acid with a refractory inorganic oxide to effect chemical combination of the refractory inorganic oxide with said hydrogen halide or ammonium halide and halosulfonic acid. Satisfactory refractory inorganic oxides for the preparation of catalysts for use in the process of this invention include high surface area crystalline alumina modifications such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition to the aforementioned gamma-, eta- and theta-aluminas which may be utilized as solid supports, it is also contemplated that other refractory oxides such as zirconia, magnesia, thoria, etc., and combinations of refractory oxides such as silica-alumina, silica-magnesia, alumina-silica-magnesia, alumina-thoria, alumina zirconia, etc., may also be utilized as solid supports for the catalyst of the present invention.

When the refractory inorganic oxide contains combined water, halogen is chemically substituted for hydroxy groups in the refractory inorganic oxide with elimination of water. For such a reaction, the halogen must be added in a form which will readily chemically react with the refractory inorganic oxide in order to obtain the desired results. Therefore, it generally is preferable to utilize a source of halogen, at a temperature of from about 100° C. to about 600° C., derived from the group consisting of hydrogen halides, such as hydrogen fluoride (which may actually increase the hydroxy-group content), hydrogen chloride, hydrogen bromide and/or hydrogen iodide and ammonium halides such as ammonium fluoride, ammonium chloride, ammonium bromide, and/or ammonium iodide although these do not all have equivalent action and the particular halogen utilized will preferably correspond to the halosulfonic acid that will be subsequently utilized. Thus, in a preferred manner of preparing the catalyst of the present invention, hydrogen chloride will be utilized when chlorosulfonic acid is utilized. The halosulfonic acid may be chemically combined with the substantially anhydrous refractory inorganic oxide at temperatures in the range of between 100° C. and 600° C. In this manner, the halosulfonic acid is vaporized as it passes over the refractory inorganic oxide and chemical combination occurs. Particularly preferred halosulfonic acids include chlorosulfonic acid and fluosulfonic acid due mainly to the cheapness and to the readiness with which they may be procured although the invention is not restricted to their use, but may employ any of the halosulfonic acids insofar as they are adaptable. However, it is not intended to infer that different halosulfonic acids which may be employed will produce catalyst which have identical effects upon any given organic reaction as each of the catalyst produced from different acids and by slightly varying procedures will exert its own characteristic action. It is also contemplated within the scope of this invention that carrier gases such as nitrogen and the like may be used.

In any case, following the chemical combination of the substantially anhydrous halosulfonic acid with the substantially anhydrous refractory oxide, the catalytic composite is heat treated. Heat treating this catalytic composite after chemical reaction with the halosulfonic acid will drive off any excess volatile material from the catalyst, thereby allowing the halosulfonic acid reaction product to remain impregnated on and chemically bonded to the refractory inorganic oxide.

As hereinbefore set forth, certain forms of alumina may be utilized as supports for the catalyst of this invention. For example, alumina may be prepared by any of the well known suitable means of manufacture, one example of which is the addition of an alkaline reagent to a salt of aluminum in an amount sufficient to form aluminum hydroxide, which upon drying and calcining is converted to alumina. Similarly, if the solid support comprises both alumina and silica, these components may be prepared by separate, successive or coprecipitation means.

For example, a refractory inorganic oxide previously prepared by the methods hereinabove set forth is then chemically combined with a halogen by treating the refractory inorganic oxide with hydrogen chloride, said hydrogen chloride being added in an amount sufficient to drive off the excess water content of the refractory inorganic oxide. Following this, the refractory inorganic oxide is then chemically combined with the halosulfonic acid in an amount sufficient to allow the finished catalytic composite to contain from about 0.01 weight percent to about 3 weight percent of halogen and from about 1.0 to about 15.0% by weight of sulfur. Following this, the chemically combined material is then heat treated in a furnace tube or muffle furnace or the like, preferably in a stream of inert dry gas such as nitrogen. The finished catalytic composite comprising the halosulfonic acid chemically combined with the refractory inorganic oxide is then utilized as the conversion catalyst.

In contradistinction to prior art hydrocarbon conversion catalysts where the chemical addition of one compound to the refractory inorganic oxide usually enhances the surface area characteristics of the refractory inorganic oxide, the chemical addition of the halosulfonic acid to the refractory inorganic oxide does not enhance the surface area characteristics of the refractory inorganic oxide inasmuch as we have found that our finished catalytic composite exhibits a significantly lower surface area than the refractory inorganic oxide originally possessed. Despite this fact, the finished catalyst composite still exhibits a higher hydrocarbon conversion activity with this lower surface area than would be expected and it is theorized that it is the particular chemical combination of the substantially anhydrous halosulfonic acid with the substantially anhydrous refractory inorganic oxide that creates this highly active catalyst even though the high surface area of the refractory inorganic oxide is reduced about 20 to 25% by this particular chemical combination.

The final catalytic composite obtained by the preparation as described hereinabove is substantially anhydrous due to the chemical combination of the halogen and/or halosulfonic acid with the refractory inorganic oxide. Thus, it is another feature of the present invention that a substantially anhydrous support initially is not necessary to prepare the catalyst of the present invention. Still another feature of the present invention is since the final catalytic composite is substantially anhydrous, deterioration of a physical nature by processing factors tending to further dry the catalyst is not a problem in the present invention.

The following examples are introduced for the purpose of illustration only with no intention of unduly limiting the generally broad scope of the present invention.

EXAMPLE I

In this example, 300 cc. of gamma-alumina spheres having a surface area of about 180 square meters per gram were treated in a furnace tube with a gaseous mixture of hydrogen chloride and nitrogen for 2 hours at 538° C. Gaseous hydrogen chloride and water appeared at the exit of the furnace tube. The then substantially anhydrous refractory inorganic oxide was then maintained at 538° C. and a substantially anhydrous chlorosulfonic acid-nitrogen mixture was passed over the catalyst so as to vaporize the chlorosulfonic acid over the alumina spheres. Appearance of a fuming gas in the exit of the furnace tube indicated when the chemical combination of the alumina with the chlorosulfonic acid was complete.

The catalyst was then cooled to room temperature in a nitrogen stream. The catalyst was analyzed for chloride and sulfur content and it was found that the catalyst contained 0.44 weight percent chloride and about 7.6 weight percent sulfur.

A portion (150 cc.) of the catalyst was then heat treated for 3 hours in a furnace tube at 538° C. in a stream of nitrogen to remove any excess volatile material from the catalyst. The heat treated catalyst was thereafter cooled and analyzed for chloride and sulfur content once again. It was found that the heat treated catalyst now contained 0.09 weight percent chloride and 7.13 weight percent sulfur clearly indicating that the chemical combination of the chlorosulfonic acid with the alumina had occurred. The surface area of the finished heat treated catalytic composite was subsequently found to be 137 square meters per gram which is a reduction in surface area of about 24%. The pore volume of this catalytic composite was found to be 0.30 milliliter per gram and the pore diameter was found to be 88 A. The catalyst was designated as catalyst A.

EXAMPLE II

Another catalyst is prepared by chemically combining chlorosulfonic acid with a high surface area (about 200 square meters per gram) substantially anhydrous silica-alumina of 25% alumina content at a temperature of about 538° C. for 2 hours after treatment with a hydrogen chloride-nitrogen mixture at the same temperature. The catalytic composite is then heat treated in a dry nitrogen stream at a temperature of about 550° C. A surface area determination of the catalytic composite indicates that the surface area of the finished catalytic composite is 20 to 25% less than that of the silica-alumina initially used. This catalyst is designated as catalyst B.

EXAMPLE III

The catalyst prepared according to Example I above designated as catalyst A is utilized in an isomerization reaction zone to determine the isomerization activity of said catalyst. In this experiment, 75 cc. of the catalyst prepared according to the method of Example I is placed in a reaction zone which is provided with heating means. In the experiment, 2-methylpentane is charged to the isomerization reaction zone. The reaction zone is maintained at about 750 p.s.i.g. and about 140° C. Substantial conversion of the 2-methylpentane to 3-methylpentane is obtained as is evidenced by gas-liquid chromatography.

EXAMPLE IV

The catalyst prepared according to Example II and designated as catalyst B is utilized in an isomerization reaction zone, 100 cc. of the finished catalyst being placed in the isomerization apparatus. In the experiment, normal methylcyclopentane is charged to the isomerization zone which is maintained at about 1000 p.s.i.g. and 190° C. Substantial conversion of the methylcyclopentane to cyclohexane is obtained as is evidenced by gas-liquid chromatography.

EXAMPLE V

The catalyst prepared according to Example I above and designated as catalyst A is again utilized in the isomerization reaction zone. In this experiment, a fresh batch of 75 cc. of the catalyst is placed in the appropriate apparatus which is provided with heating means. In the experiment, normal hexane is charged to the isomerization reactor which is maintained at about 1200 p.s.i.g. and about 230° C. Substantial conversion of the normal hexane to 2-methylpentane and 3-methylpentane as well as to some 2,3- and 2,2-dimethylbutanes is obtained as is evidenced by gas-liquid chromatography.

We claim as our invention:

1. A method of catalyst manufacture which comprises reacting a refractory inorganic oxide at a temperature of from about 100° C. to about 600° C. with a hydrogen halide or ammonium halide and subsequently reacting the resultant substantially anhydrous refractory inorganic oxide at a temperature of from about 100° C. to about 600° C. with a substantially anhydrous halosulfonic acid in an amount to chemically combine with the oxide from about 0.01 to about 3 weight percent of halogen and from about 1.0 to about 15.0 weight percent of sulfur.

2. The method of claim 1 further characterized in that said refractory inorganic oxide comprises alumina.

3. A catalytic composition of matter comprising the reaction product, formed at a temperature of from about 100° C. to about 600° C., of (A) a substantially anhydrous halosulfonic acid and (B) a halided refractory inorganic oxide, said composition (B) being formed by reacting said refractory oxide, at a temperature of from about 100° C. to about 600° C., with a hydrogen halide or ammonium halide, said catalytic composition containing in chemical combination with the oxide from about 0.01 to about 3 weight percent of halogen and from about 1.0 to about 15.0 weight percent of sulfur.

4. The catalyst of claim 3 further characterized in that said oxide comprises alumina.

References Cited

UNITED STATES PATENTS

| 2,344,890 | 3/1944 | Whiteley | 260—683.68 |
| 2,397,639 | 4/1946 | Berg et al. | 260—683.2 |

DANIEL F. WYMAN, *Primary Examiner.*

PATRICK P. GARVIN, *Examiner.*